(12) United States Patent  (10) Patent No.: US 8,479,756 B1
Tieskotter et al.  (45) Date of Patent: Jul. 9, 2013

(54) CANOPY ASSEMBLY

(76) Inventors: Veronica Y. Tieskotter, Phoenix, AZ (US); Ken J. Bourassa, Phoenix, AZ (US)

(*) Notice: Subject to any disclaimer, the term of this patent is extended or adjusted under 35 U.S.C. 154(b) by 0 days.

(21) Appl. No.: 13/416,090

(22) Filed: Mar. 9, 2012

(51) Int. Cl.
*E04H 15/06* (2006.01)
(52) U.S. Cl.
USPC .................................................. 135/88.03
(58) Field of Classification Search
USPC ............................ 135/88.03, 88.04
See application file for complete search history.

(56) References Cited

U.S. PATENT DOCUMENTS

| | | | |
|---|---|---|---|
| 572,843 A * | 12/1896 | Van Vechten | 135/88.04 |
| 603,916 A * | 5/1898 | Metzger | 135/88.04 |
| 614,364 A * | 11/1898 | Burnham | 135/88.04 |
| 617,096 A | 1/1899 | Harrison | |
| 726,610 A | 4/1908 | Zech | |
| 3,032,046 A * | 5/1962 | Coonradt | 135/90 |
| 3,256,034 A | 6/1966 | Condray | |
| D215,393 S | 9/1969 | Stith, Jr. | |
| D218,923 S | 10/1970 | Shafer | |
| 4,300,798 A * | 11/1981 | Musgrove et al. | 297/184.15 |
| 4,781,411 A * | 11/1988 | Kolb | 297/184.15 |
| 5,102,190 A * | 4/1992 | Akin et al. | 297/184.15 |
| 5,441,067 A * | 8/1995 | James et al. | 135/96 |
| 5,579,797 A * | 12/1996 | Rogers | 135/90 |
| 5,638,849 A * | 6/1997 | Scott | 135/96 |
| 5,975,614 A | 11/1999 | McGrue | |
| 6,209,611 B1 * | 4/2001 | Johnson | 160/84.01 |
| 7,861,735 B2 * | 1/2011 | Stepaniuk et al. | 135/88.01 |
| 2003/0230326 A1 | 12/2003 | Lin | |

* cited by examiner

*Primary Examiner* — Noah Chandler Hawk

(57) ABSTRACT

A canopy assembly is provided for shading a person while riding a bicycle. The assembly includes a pair of spaced side members and a pair of spaced end members. The end members are coupled to and extend between the side members defining an open frame. A cover is coupled to the frame. A connecting bar has an upper end and a lower end. The upper end of the connecting bar is coupled to the frame. A clamp is coupled to the lower end of the connecting bar frictionally engaging a bicycle whereby the frame is coupled to the bicycle.

13 Claims, 5 Drawing Sheets

CANOPY ASSEMBLY

BACKGROUND OF THE DISCLOSURE

Field of the Disclosure

The disclosure relates to canopy devices and more particularly pertains to a new canopy device for shading a person while riding a bicycle.

SUMMARY OF THE DISCLOSURE

An embodiment of the disclosure meets the needs presented above by generally comprising a pair of spaced side members and a pair of spaced end members. The end members are coupled to and extend between the side members defining an open frame. A cover is coupled to the frame. A connecting bar has an upper end and a lower end. The upper end of the connecting bar is coupled to the frame. A clamp is coupled to the lower end of the connecting bar frictionally engaging a bicycle whereby the frame is coupled to the bicycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
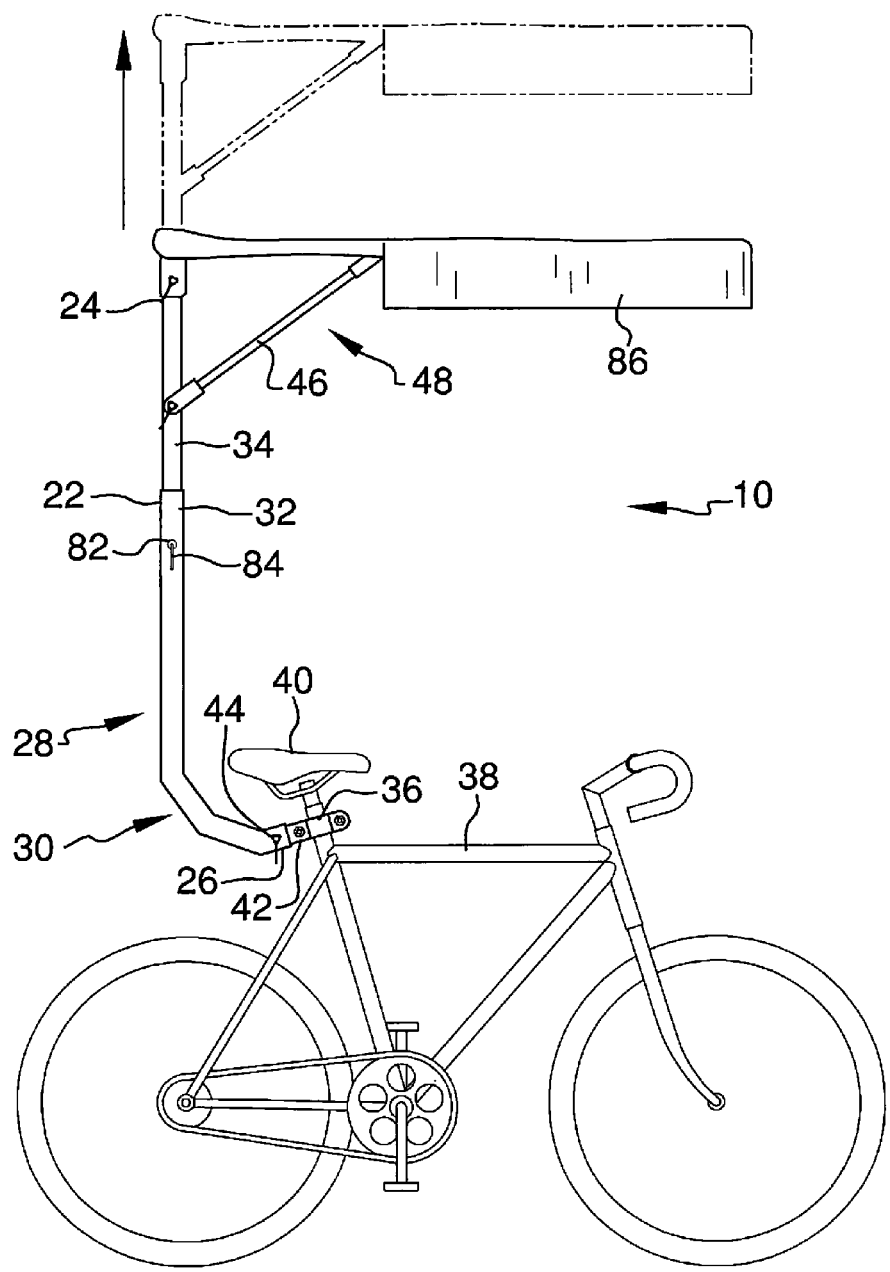
FIG. 1 is a side view of a canopy assembly according to an embodiment of the disclosure.
Figure 2:
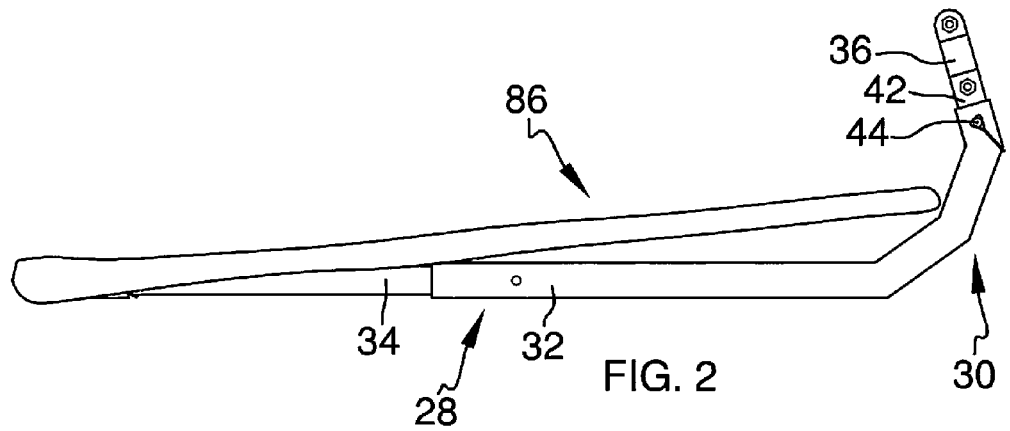
FIG. 2 is a side view of an embodiment of the disclosure in a storage position.
Figure 3:
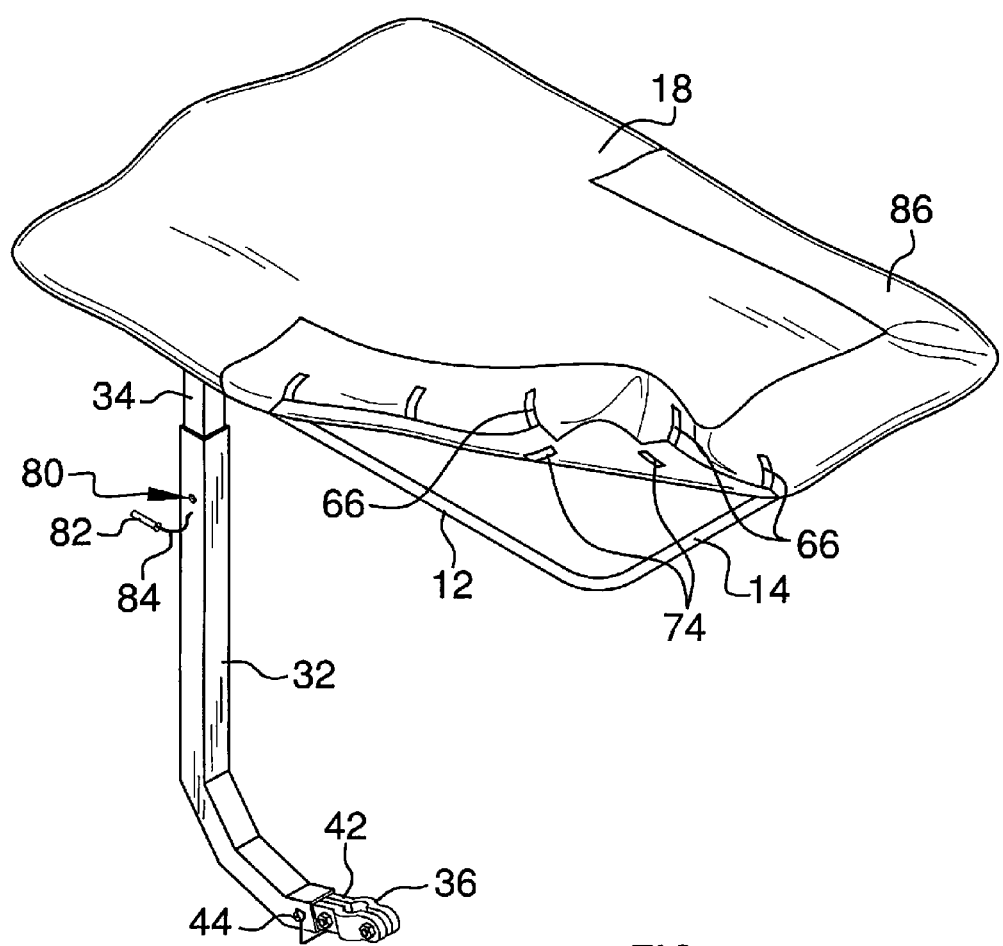
FIG. 3 is a top front side perspective view of an embodiment of the disclosure.
Figure 4:
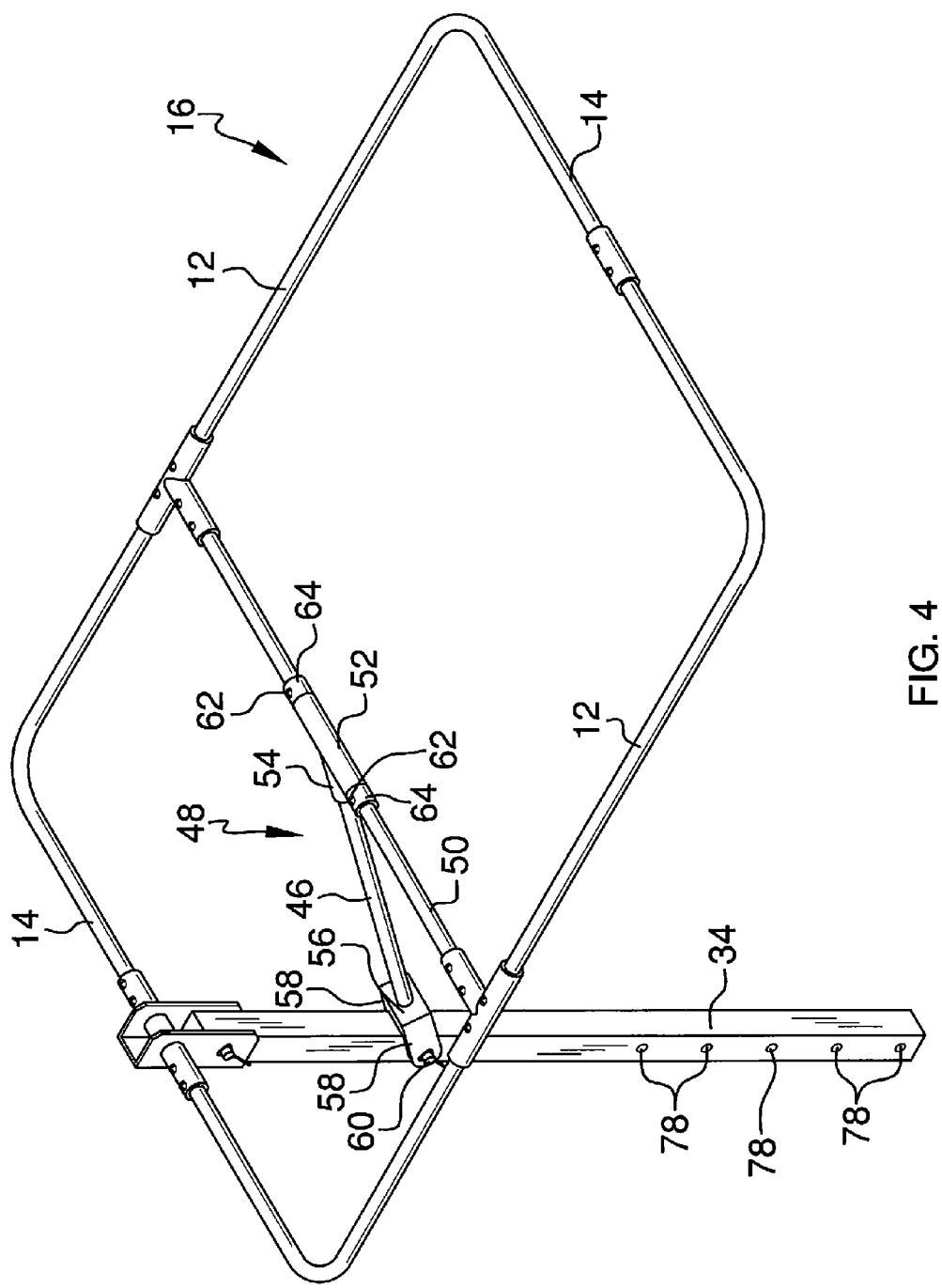
FIG. 4 is a top front side perspective view of an embodiment of the disclosure.
Figure 5:
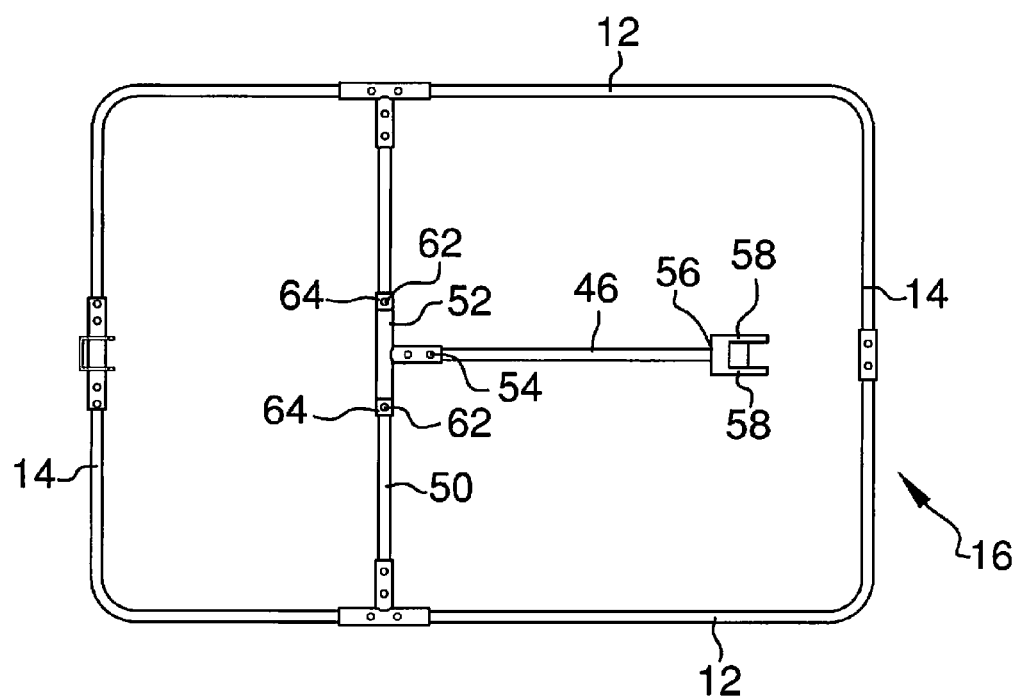
FIG. 5 is a top view of an embodiment of the disclosure.
Figure 6:
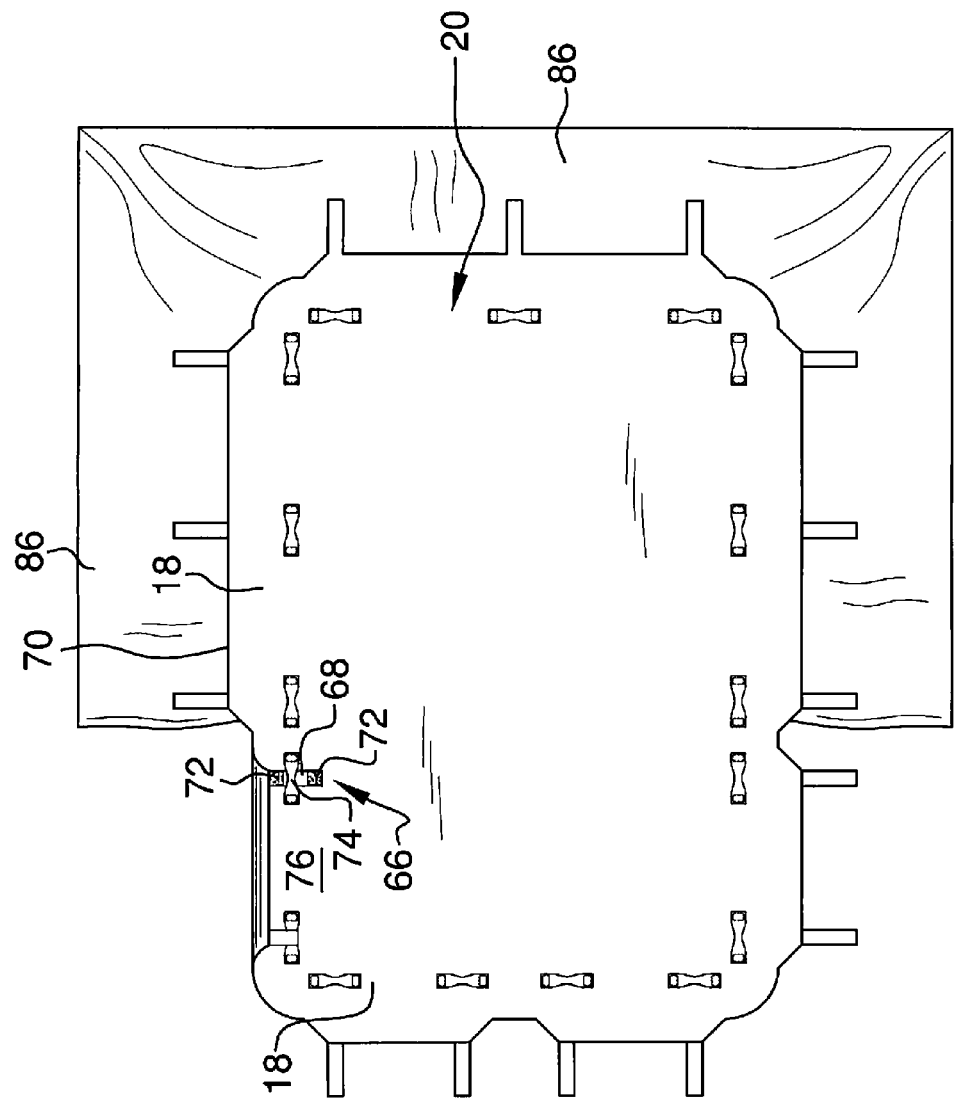
FIG. 6 is a bottom view of an embodiment of the disclosure.

With reference now to the drawings, and in particular to FIGS. 1 through 6 thereof, a new canopy device embodying the principles and concepts of an embodiment of the disclosure and generally designated by the reference numeral 10 will be described.

As best illustrated in FIGS. 1 through 6, the canopy assembly 10 generally comprises a pair of spaced side members 12 and a pair of spaced end members 14. The end members 14 are coupled to and extend between the side members 12 defining an open frame 16. A cover 18 is coupled to the frame 16. The cover 18 may be a mesh screen 20 providing shade and protection from ultraviolet rays. A telescopic connecting bar 22 has an upper end 24 and a lower end 26. The upper end 24 of the connecting bar 22 is pivotally coupled to the frame 16. The connecting bar 22 further has a straight upper section 28 and a lower section 30 extending from the straight upper section 28. The straight upper section 28 of the connecting bar 22 has a sleeve portion 32 and an insertion portion 34 slidably inserted into the sleeve portion 32. A clamp 36 is coupled to the lower end 26 of the connecting bar 22. The clamp 36 is configured for frictionally engaging a bicycle 38. Thus, the frame 16 is coupled to the bicycle 38 with the cover 18 positioned over the bicycle 38.

The lower section 30 of the connecting bar 22 extends forwardly and away from the straight upper section 28 of the connecting bar 22 whereby the lower end 26 of the connecting bar 22 is configured for positioning the clamp 36 below a seat 40 of the bicycle 38 when the clamp 36 is coupled to the bicycle 38. The clamp 36 is removably coupled to the connecting bar 22 such that the clamp 36 may remain coupled to the bicycle 38 when the connecting bar 22 is disengaged from the bicycle 38. The clamp 36 may have an extended connector 42 coupled to the connecting bar 22 by a clamp pin 44.

A bracing member 46 is coupled to the frame 16 for supporting the frame in an extended position 48 relative to the connecting bar 22. A central member 50 is coupled to and extends between the side members 12 of the frame 16. A collar 52 is rotatably coupled around the central member 50. An upper end 54 of the bracing member 46 is coupled to the collar 52. A lower end 56 of the bracing member 46 has a pair of spaced arms 58 positionable around the connecting bar 22. A bracing pin 60 is removably inserted through the arms 58 and the connecting bar 22 whereby the lower end 56 of the bracing bar 46 is releasably coupled to the connecting bar 22. An outwardly biased post 62 may engage the collar 52 when the frame 16 is in the extended position 48 whereby rotation of the collar 52 is inhibited. The post 62 may be outwardly biased by a generally U-shaped spring positioned in the central member 50 that is compressible to disengage the post 62 from the collar 52. The post 62 may be one of two such posts 62, each positioned proximate a respective end 64 of the collar 52.

A plurality of fasteners 66 is coupled to the cover 18 for coupling the cover 18 to the frame 16. Each fastener 66 may be a strip 68 extending from a perimeter edge 70 of the cover 18. Each strip 68 has complimentary portions of hook and loop fastener 72 thereon. A plurality of loops 74 is coupled to a bottom surface 76 of the cover 18. Each strip 68 is insertable through an associated one of the loops 74 such that the complimentary portions of hook and loop fastener 72 are engageable whereby the fastener 66 is coupled to the associated loop 74. A valance 86 may be coupled to and extend from the perimeter edge 70 of the cover 18.

A plurality of holes 78 extend through the insertion portion 34. The holes 78 are positioned in spaced relationship along a length of the insertion portion 34. A pair of aligned openings 80 is positioned in the sleeve portion 32. The openings 80 are alignable with a selectable one of the holes 78. The insertion portion 34 may also be hollow in which case each hole 78 will be formed by a pair of aligned holes in opposite walls of the insertion portion 34. A peg 82 is removably inserted through the openings 80 and a selected one of the holes 78. Thus, a length of the connecting bar 22 is adjustable to vary the height of the cover 18 over the person on the bicycle 38. A tether 84 may be coupled between the peg 82 and the sleeve portion 34 of the connecting bar 22 to prevent loss of the peg 82.

In use, the clamp 36 is engaged to the bicycle 38. The connecting bar 22 is coupled to the clamp 36 to extend from the bicycle 38 positioning the frame 16 over the seat 42. The cover 18 is attached to the frame 16 providing shade and/or ultraviolet light protection. The connecting bar 22 may be adjusted for length to position the cover 18 at a desired height relative to the seat 42. When not in use, the bracing member 46 may be disengaged from the connecting bar 22 and rotated to be coplanar with the frame 16. The frame 16 may be pivoted towards the connecting bar 22 into a collapsed position 86 for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A canopy assembly comprising:
   a pair of spaced side members;
   a pair of spaced end members, said end members being coupled to and extending between said side members defining an open frame;
   a cover coupled to said frame;
   a connecting bar having an upper end and a lower end, said upper end of said connecting bar being coupled to said frame, said connecting bar being pivotally coupled to said frame;
   a clamp coupled to said lower end of said connecting bar, said clamp being configured for frictionally engaging a bicycle whereby said frame is coupled to the bicycle;
   a bracing member coupled to said frame, said bracing member supporting said frame in an extended position relative to said connecting bar;
   a central member coupled to and extending between said side members of said frame;
   a collar rotatably coupled around said central member, an upper end of said bracing member being coupled to said collar; and
   an outwardly biased post, said post engaging said collar when said frame is in said extended position whereby rotating of said collar is inhibited.

2. The assembly of claim 1, further including said connecting bar being telescopic.

3. The assembly of claim 1, further comprising:
   a lower end of said bracing member having a pair of spaced arms positionable around said connecting bar; and
   a bracing pin removably inserted through said arms and said connecting bar whereby said lower end of said bracing bar is releasably coupled to said connecting bar.

4. The assembly of claim 1, further including a plurality of fasteners coupled to said cover, said fasteners coupling said cover to said frame.

5. The assembly of claim 4, further comprising:
   each said fastener being strip extending from a perimeter edge of said cover, each strip having complimentary portions of hook and loop fastener thereon; and
   a plurality of loops coupled to a bottom surface of said cover each said strip being insertable through an associated one of said loops such that said complimentary portions of hook and loop fastener are engageable whereby said fastener is coupled to said associated loop.

6. The assembly of claim 1, further including a valance coupled to and extending from a perimeter edge of said cover.

7. The assembly of claim 1, further including said connecting bar having a straight upper section and a lower section extending from said straight upper section, said lower section extending forwardly and away from said straight upper section whereby said lower end of said connecting bar is configured for positioning said clamp below a seat of the bicycle when the clamp is coupled to the bicycle.

8. The assembly of claim 7, further including said straight upper section of said connecting bar having a sleeve portion and an insertion portion, said insertion portion being slidably inserted into said sleeve portion.

9. The assembly of claim 8, further comprising:
   a plurality of holes extending through said insertion portion, said holes being positioned in spaced relationship along a length of said insertion portion;
   a pair of aligned openings positioned in said sleeve portion, said openings being alignable with a selectable one of said holes; and
   a peg removably inserted through said openings and a selected one of said holes whereby a length of said connecting bar is adjustable.

10. The assembly of claim 9, further including a tether coupled between said peg and said sleeve portion of said connecting bar.

11. The assembly of claim 1, further including said clamp being removably coupled to said connecting bar whereby said clamp is configured for remaining coupled to the bicycle when said connecting bar is disengaged from the bicycle.

12. The assembly of claim 1, further including said cover being a mesh screen.

13. A canopy assembly comprising:
   a pair of spaced side members;
   a pair of spaced end members, said end members being coupled to and extending between said side members defining an open frame;
   a cover coupled to said frame, said cover being a mesh screen;
   a telescopic connecting bar having an upper end and a lower end, said upper end of said connecting bar being pivotally coupled to said frame, said connecting bar having a straight upper section and a lower section extending from said straight upper section, said straight upper section of said connecting bar having a sleeve portion and an insertion portion, said insertion portion being slidably inserted into said sleeve portion;
   a clamp coupled to said lower end of said connecting bar, said clamp being configured for frictionally engaging a bicycle whereby said frame is coupled to the bicycle, said lower section of said connecting bar extending forwardly and away from said straight upper section of said connecting bar whereby said lower end of said connecting bar is configured for positioning said clamp below a seat of the bicycle when the clamp is coupled to the bicycle, said clamp being removably coupled to said connecting bar whereby said clamp is configured for remaining coupled to the bicycle when said connecting bar is disengaged from the bicycle;
   a bracing member coupled to said frame, said bracing member supporting said frame in an extended position relative to said connecting bar;
   a central member coupled to and extending between said side members of said frame;

a collar rotatably coupled around said central member, an upper end of said bracing member being coupled to said collar;

a lower end of said bracing member having a pair of spaced arms positionable around said connecting bar;

a bracing pin removably inserted through said arms and said connecting bar whereby said lower end of said bracing bar is releasably coupled to said connecting bar;

an outwardly biased post, said post engaging said collar when said frame is in said extended position whereby rotating of said collar is inhibited;

a plurality of fasteners coupled to said cover, said fasteners coupling said cover to said frame, each said fastener being strip extending from a perimeter edge of said cover, each strip having complimentary portions of hook and loop fastener thereon;

a plurality of loops coupled to a bottom surface of said cover each said strip being insertable through an associated one of said loops such that said complimentary portions of hook and loop fastener are engageable whereby said fastener is coupled to said associated loop;

a valance coupled to and extending from said perimeter edge of said cover;

a plurality of holes extending through said insertion portion, said holes being positioned in spaced relationship along a length of said insertion portion;

a pair of aligned openings positioned in said sleeve portion, said openings being alignable with a selectable one of said holes;

a peg removably inserted through said openings and a selected one of said holes whereby a length of said connecting bar is adjustable; and a tether coupled between said peg and said sleeve portion of said connecting bar.

\* \* \* \* \*